United States Patent [19]
Goding

[11] 3,848,996
[45] Nov. 19, 1974

[54] PHOTOCOMPOSING APPARATUS

[75] Inventor: Justin Christian Goding, Rochester, N.Y.

[73] Assignee: Xerox Corporation, Stamford, Conn.

[22] Filed: May 16, 1973

[21] Appl. No.: 360,725

[52] U.S. Cl. .................. 355/43, 355/45, 355/60, 355/66
[51] Int. Cl. ............................................ G03b 27/70
[58] Field of Search ............ 355/40, 43, 44, 45, 54, 355/57, 60, 61, 65, 66

[56] References Cited
UNITED STATES PATENTS
3,036,495  5/1962  Kuster.................................. 355/60

Primary Examiner—Richard A. Wintercorn
Attorney, Agent, or Firm—Robert J. Bird

[57] ABSTRACT

A photocomposing apparatus for positioning of an optical exposure system so that different size originals supported in the object plane of the system can be recorded within a predetermined format upon a sensitized recording medium supported in the image plane of the system. The optical system is arranged so that movement of the system causes an image of the original to be either minified or magnified at the image plane at the operator's option. A light image of the outer margins of the desired format is projected back through the optical system thereby presenting to the operator an outline at the object plane of the area upon the original that will be recordable within the format. The original is then placed over the image outline and the optics are adjusted so that the image encompasses the original to be reproduced.

6 Claims, 3 Drawing Figures

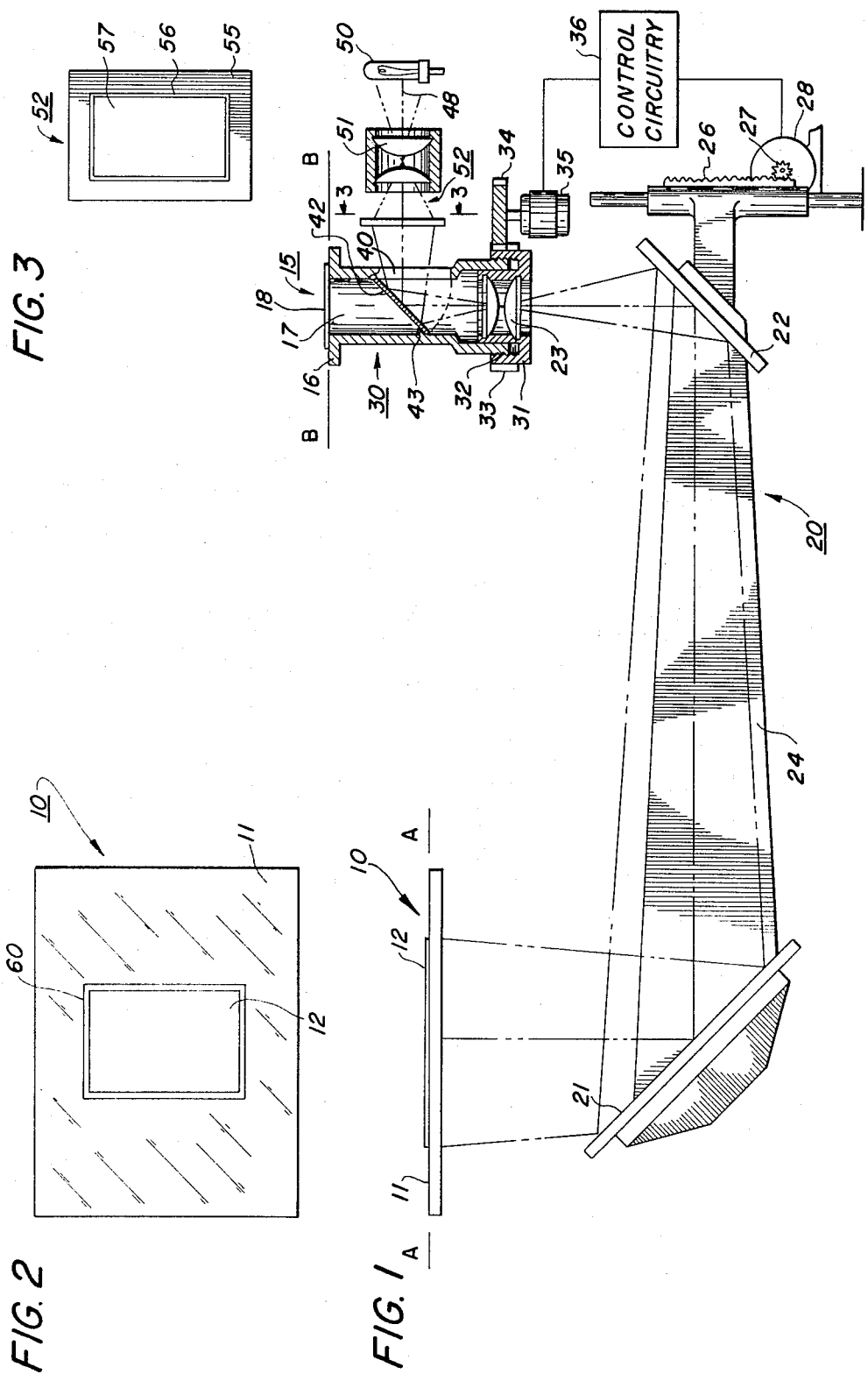

PHOTOCOMPOSING APPARATUS

This invention relates to apparatus for facilitating the recording of a light image within a desired format upon a sensitized recording medium such as a microfiche card or the like.

More specifically, this invention relates to a photocomposing device for placing images of various sized originals within a given format upon a sensitized recording medium. In many copying devices that are in general use today, images of originals, that are subject to repeated copying, are often times placed in minified form within a predetermined format upon intermediate supports, such as microfiche cards of the like. In this manner, the images can be conveniently stored and retrieved when needed. Heretofore, to place the image of the original within a prescribed format necessitated the use of relatively complex photocomposing devices which were difficult to use and therefore wasted a good deal of the operator's time. As exemplified in U.S. Pat. No. 3,576,365, these prior other devices generally involved projecting a first image of the original upon a viewing screen, superimposing an artificially created second light image of the desired format over the original and adjusting the exposure optics to a point where the two images occupy the same area upon the screen. As can be seen, this type of photocomposing equipment requires not only a separate viewing station but also requires means to present two distinct images upon the viewing platen.

It is, therefore, the object of the present invention to simplify photocomposing apparatus.

A further object of the present invention is to provide photocomposing apparatus that can be rapidly and accurately adjusted to record images of various size originals within a predetermined format.

These and other objects of the present invention are obtained by means of a photocopying device having a transparent viewing platen for supporting an original, in a fixed object plane, an image of which is to be placed within a predetermined format upon a sensitized recording medium, a support surface at a fixed image plane for supporting the recording medium therein, a movable optical exposure system interposed between the object and image planes projecting light images of the original onto the recording medium, means for creating a light image of the outer margins of the format of the platen by projecting the image of the margins back through the optical exposure system, and means to reposition the optical system whereby the image of the format encompasses the original supported upon the platen.

For a better understanding of the invention as well as other objects and further features thereof, reference is had to the following detailed description of the invention to be read in connection with the accompanying drawings, wherein:

FIG. 1 is a schematic representation of apparatus embodying the teachings of the present invention;

FIG. 2 is a top view of the original support platen of the present apparatus showing a document centered thereon;

FIG. 3 is an end view taken along line 3—3 in FIG. 1 showing the mask used to create a light image representative of the outer margins of the format at the viewig platen.

Referring now to FIG. 1, there is shown a schematic view of the photocomposing device embodying the teachings of the present invention. A viewing station, generally referenced 10, is herein provided which includes a transparent horizontal support platen 11 upon which a document 12 can be conveniently supported. An imaging station 15 is positioned opposite the viewing platen which includes a support surface 16 having a clear aperture or exposure slit 17 formed therein. The support surface 16 is arranged so that a sensitized light receiving medium, such as a microfiche card 18, can be mounted over the exposure slit. Interposed between the fixed object plane A—A of the apparatus, which is defined by the platen surface 11, and the fixed image plane B—B, which is defined by the top plane of the support surface 16, is a stepless exposure system, generally referenced 20, that is capable of being moved to an infinite number of locations within the operating range of the system to either magnify or minify images of an original projected onto the image plane B—B.

The exposure system is made up of a first planar reflecting surface 21 and a second planar reflecting surface 22, and a projection lens 23. The reflecting surfaces are mounted within a movable carriage 24 which is arranged to be driven in a vertical direction via a rack 26 and a pinion 27. A motor 28 is operatively connected to the pinion through which power is provided to move the reflecting surfaces either towards or away from the fixed image and object planes of the photocomposing apparatus.

The lens element 23 is supported within a movable mounting 31 operatively secured to the barrel 30 by means of screw threads 32. The outer periphery of mounting 31 is provided with gear teeth 33 which mesh with a drive gear 34. The drive gear, in turn, is operatively connected to a second motor means 35. The two motor drives 28 and 35 are connected via the lines provided to an electrical control circuitry 36 which functions to regulate the relative positions and the reflecting surfaces and the lens element whereby images of the original projected onto the image plane remain in focus for all positions of the optical exposure system within the operating range of the photocomposing device.

It should be understood, that repositioning of the optical elements will cause the image of the original to be created in the image plane to be either minified or magnified depending on the manner in which the various elements are repositioned.

A clear aperture 40 is provided in the right hand side wall of the lens barrel 30 as viewed in FIG. 1. A mirror 42 is pivotably hinged within the opening and forms a light tight seal with the barrel wall when positioned in the down position as illustrated by the dotted lines in FIG. 1. The mirror is adapted to be raised upwardly about the hinge provided whereby the mirrored surface thereon is interposed within the optical light path 48 of the optical exposure system. When raised to the up or photocomposing position, the mirror serves to redirect the optical path along the optical center line 48 which passes through aperture 40.

Positioned along the optical path 48 is a source of actinic light 50, a projection lens 51 and an optical mask 52. As shown in FIG. 3, the optical mask is made of an opaque outer region 55, a transparent frame 56 and an opaque interior region 57. In assembly, the mask is centered about the optical centerline of the redirected light path 48 in a plane that is equidistant from the object plane A—A as is the image plane B—B when measured along their respective optical paths.

When the instant apparatus is placed in a photocomposing mode of operation, the mirror 42 is raised upwardly against a positioning stop 43, mounted upon the inner wall of the lens barrel, whereby the mirror is at approximtely 45° with the optical centerline of the exposure system 20. The light source is then illuminated and the light energy is projected via lens 51, through the mask back onto the viewing platen 11. In practice, the transparent frame formed in the mask defines the outer margins of the desired image format. Because the mask is located the same distance from the platen surface (object plane A—A of the apparatus) as the image plane B—B the visual image 60 that is created at the platen 11 is representative of the area on or at the platen that can be recorded within the format or a particular setting of the exposure system. As can be seen, any adjustment of the exposure system will of course cause a corresponding expansion or compression of the light image presented at the platen and thus providing the operator with a visual representation of a margin or frame indicating the size of an original that can be recorded within the desired format or each and every position of the optical system.

In operation, the original to be copied is centered upon the viewing platen surface as seen in FIG. 1 and the stepless exposure system is adjusted until the light image of the format margins coincides with the margin areas of the original. It should be understood, however, that the size and shape of the original documents to be copied may often times not coincide with the exact shape of the format margins. In this case, the exposure system is adjusted unitl the light image of the format margins encompasses the original or portion thereof to be recorded with a minimum amount of wasted space between the respective margin areas. Once the exposure optics have been adjusted in the manner described above, the mirror 42 is moved out of the exposure system optical path and the image of the original is then projected through the exposure system onto the recording medium and an image of the original subject matter is recorded thereon within the predetermined format.

While this invention has been described with reference to the structure disclosed herein, it is not confined to the details set forth and this application is intended to cover such modifications and changes as may come within the scope of the following claims.

What is claimed is:

1. A photocomposing device for positioning a movable optical exposure system to project a light image of an original onto a recording medium within a predetermined format including:
    a platen for supporting an original to be reproduced within the object plane of the photocomposing device,
    an imaging station for supporting a recording medium within the image plane of the photocomposing device,
    movable exposure means for projecting a light image of the original, supported in said object plane, onto the recording medium supported in said image plane, said exposure means being arranged to be repositionable between the object and image planes to minify or magnify the image of the original projected onto the image plane,
    means to create a light image at the platen surface indicative of the original surface area recordable within said predetermined format for any position of said optical system, said means to create a light image including
        an opaque mask positioned off the optical axis of the exposure system having a transparent frame formed therein;
        means to illuminate said mask; and
        a mirror means interposable into the optical path of the exposure means for projecting a light image of the mask information back through said exposure means onto said viewing platen.

2. The apparatus of claim 1 wherein the mask and the image plane of said exposure system are positioned equally distant from the platen surface along their respective optical axis.

3. The apparatus of claim 1 further including a projecting lens positioned between said source of illumination and said mask.

4. The apparatus of claim 1 wherein the optical path of the exposure means is folded to redirect the optical light path of the system.

5. The apparatus of claim 1 wherein the mask is illuminated with actinic light.

6. The apparatus of claim 1 wherein the transparent frame formed in said mask represents the outer margins of the predetermined format.

* * * * *